United States Patent
El Emam et al.

(10) Patent No.: US 9,773,124 B2
(45) Date of Patent: Sep. 26, 2017

(54) SYSTEM AND METHOD FOR SHIFTING DATES IN THE DE-IDENTIFICATION OF DATASETS

(71) Applicant: Privacy Analytics Inc., Ottawa ON, CA (US)

(72) Inventors: Khaled El Emam, Ottawa (CA); Luk Arbuckle, Ottawa (CA); Ben Eze, Orleans (CA); Geoffrey Green, Ottawa (CA)

(73) Assignee: PRIVACY ANALYTICS INC., Ottawa (CA)

( * ) Notice: Subject to any disclaimer, the term of this patent is extended or adjusted under 35 U.S.C. 154(b) by 244 days.

(21) Appl. No.: 14/720,009

(22) Filed: May 22, 2015

(65) Prior Publication Data

US 2015/0339496 A1  Nov. 26, 2015

Related U.S. Application Data

(60) Provisional application No. 62/002,461, filed on May 23, 2014.

(51) Int. Cl.
*G06F 21/62* (2013.01)
*G06F 17/30* (2006.01)

(52) U.S. Cl.
CPC .... *G06F 21/6254* (2013.01); *G06F 17/30876* (2013.01); *G06F 21/6227* (2013.01)

(58) Field of Classification Search
None
See application file for complete search history.

(56) References Cited

U.S. PATENT DOCUMENTS

| | | | | |
|---|---|---|---|---|
| 2004/0181670 | A1* | 9/2004 | Thune | G06F 21/6263 713/176 |
| 2004/0199781 | A1* | 10/2004 | Erickson | G06F 17/30595 726/26 |
| 2005/0010448 | A1* | 1/2005 | Mattera | G06Q 10/10 705/3 |
| 2005/0165623 | A1* | 7/2005 | Landi | G06Q 50/22 705/2 |
| 2006/0123461 | A1* | 6/2006 | Lunt | G06F 21/6254 726/1 |

(Continued)

FOREIGN PATENT DOCUMENTS

JP  2014178680  * 9/2014

*Primary Examiner* — Peter Poltorak
(74) *Attorney, Agent, or Firm* — Maldjian Law Group LLC

(57) ABSTRACT

A system and method of performing date shifting with randomized intervals for the de-identification of a dataset from a source database containing information identifiable to individuals is provided. The de-identified dataset is retrieved comprising a plurality of entries or records containing personal identifying information. Date quasi-identifiers in the dataset for the entries can be identified within the data set which may be used potentially identifiable for a patient. Date events are consolidated in the date quasi-identifiers and connected dates in the dataset. The date events are moved relative to an anchor date in a longitudinal sequence of the date events. De-identification of the entries in the dataset including the date quasi-identifiers is performed to meet a risk metric defining risk of re-identified patients associated with the records.

20 Claims, 19 Drawing Sheets

(56) References Cited

U.S. PATENT DOCUMENTS

| | | | |
|---|---|---|---|
| 2006/0143037 A1* | 6/2006 | Artiguenave | G06Q 10/06 705/70 |
| 2008/0240425 A1* | 10/2008 | Rosales | G06F 21/6254 380/28 |
| 2010/0077006 A1* | 3/2010 | El Emam | G06F 17/30536 707/785 |
| 2010/0114840 A1* | 5/2010 | Srivastava | G06F 21/6254 707/688 |
| 2010/0169332 A1* | 7/2010 | Bezzi | G06F 17/30386 707/757 |
| 2010/0332537 A1* | 12/2010 | El Emam | G06F 21/6254 707/771 |
| 2011/0119661 A1* | 5/2011 | Agrawal | G06F 21/566 717/154 |
| 2011/0258206 A1* | 10/2011 | El Emam | G06F 21/577 707/754 |
| 2012/0131481 A1* | 5/2012 | Gupta | G06Q 10/10 715/764 |
| 2012/0197915 A1* | 8/2012 | Miyakawa | G06Q 10/00 707/755 |
| 2013/0182007 A1* | 7/2013 | Syeda-Mahmood | G06F 19/321 345/629 |
| 2013/0198194 A1* | 8/2013 | Chen | G06F 17/30539 707/740 |
| 2013/0291128 A1* | 10/2013 | Ito | G06F 21/6254 726/30 |
| 2013/0304761 A1* | 11/2013 | Redlich | G06Q 10/06 707/781 |
| 2013/0339053 A1* | 12/2013 | Jacobs | G06F 19/3443 705/3 |
| 2014/0013065 A1* | 1/2014 | Arakawa | G06F 3/0604 711/154 |
| 2014/0047551 A1* | 2/2014 | Nagasundaram | G06F 21/60 726/26 |
| 2014/0181988 A1* | 6/2014 | Umeda | G06F 21/6254 726/26 |
| 2014/0189858 A1* | 7/2014 | Chen | G06F 17/30289 726/22 |
| 2014/0304244 A1* | 10/2014 | Toyoda | G06F 21/6254 707/696 |
| 2014/0317756 A1* | 10/2014 | Takahashi | G06F 21/6254 726/26 |
| 2015/0007249 A1* | 1/2015 | Bezzi | G06F 21/6227 726/1 |
| 2015/0033356 A1* | 1/2015 | Takenouchi | H04L 63/0407 726/26 |
| 2015/0169895 A1* | 6/2015 | Gkoulalas-Divanis | G06F 21/6254 726/26 |
| 2015/0220945 A1* | 8/2015 | Iannace | G06Q 30/0202 705/7.31 |
| 2015/0293980 A1* | 10/2015 | Dola | G06F 17/30563 726/26 |

* cited by examiner

| Original Sequence | Running Difference |
|---|---|
| 2001-04-08 | 2001-04-08 (anchor) |
| 2002-05-07 | 394 days |
| 2002-08-12 | 97 days |
| 2003-07-27 | 349 days |
| 2003-08-11 | 15 days |

*Figure 1*

| Running Difference | Previous Date + Running Difference | Back to Dates |
|---|---|---|
| 2001-04-08 (anchor) | 2001-04-08 | 2001-04-08 |
| 394 days | 2001-04-08 + 394 | 2002-05-07 |
| 97 days | 2002-05-07 + 97 | 2002-08-12 |
| 349 days | 2002-08-12 + 349 | 2003-07-27 |
| 15 days | 2003-07-27 + 15 | 2003-08-11 |

*Figure 2*

| Running Difference | Generalized Difference | Randomized Difference |
|---|---|---|
| 2001-04-08 (anchor) | 2001-04 | 2001-04-23 |
| 394 days | [393-399] | 398 days |
| 97 days | [92-98] | 96 days |
| 349 days | [344-350] | 345 days |
| 15 days | [15-21] | 20 days |

| Original Sequence | Previous Date + Randomized Difference | De-identified Sequence |
|---|---|---|
| 2001-04-08 | 2001-04-23 | 2001-04-23 |
| 2002-05-07 | 2001-04-23 + 398 | 2002-05-26 |
| 2002-08-12 | 2002-05-26 + 96 | 2002-08-30 |
| 2003-07-27 | 2002-08-30 + 345 | 2003-08-10 |
| 2003-08-11 | 2003-08-10 + 20 | 2003-08-30 |

| Original Sequence | Running Difference | Generalized Difference |
|---|---|---|
| 2004-05-12 | 2004-05-12 (anchor) | 2004-05 |
| 2004-05-12 | 0 | 0 |
| 2004-05-13 | 1 | 1 |
| 2004-05-14 | 1 | 1 |
| 2004-05-19 | 5 | [2-8] |

| Original Sequence | Previous Date + Randomized Difference | De-identified Sequence |
|---|---|---|
| 2004-05-12 | 2004-05-22 | 2004-05-22 |
| 2004-05-12 | 2004-05-22 + 0 | 2004-05-22 |
| 2004-05-13 | 2004-05-22 + 1 | 2004-05-23 |
| 2004-05-14 | 2004-05-23 + 1 | 2004-05-24 |
| 2004-05-19 | 2004-05-24 + 4 | 2004-05-28 |

| Running Difference | Generalized Difference | Expected Difference |
|---|---|---|
| 2001-04-08 (anchor) | 2001-04 | 2001-04-15/16 |
| 394 days | [393-399] | 396 days |
| 97 days | [92-98] | 95 days |
| 349 days | [344-350] | 347 days |
| 15 days | [15-21] | 18 days |

| Original Sequence | Running Difference | Level |
|---|---|---|
| 1970-09-25 | 1970-09-25 (front anchor) | 1 |
| 2001-04-08 | 11,153 days | 1 |
| 2002-05-07 | 394 days | 2 |
| 2002-08-12 | 97 days | 2 |
| 2003-07-27 | 349 days | 2 |
| 2003-08-11 | 15 days | 2 |
| 2005-02-21 | 560 days (rear anchor) | 2 |
| 2005-02-21 | 12,568 days (rear anchor) | 1 |

} connected

| Running Difference | Generalized Difference | Randomized Difference |
|---|---|---|
| 1970-09-25 (anchor) | 1970 | 1970-04-17 |
| 11,153 days | [11,141-11,231] | 11,148 |
| 394 days | [393-399] | 398 days |
| 97 days | [92-98] | 96 days |
| 349 days | [344-350] | 345 days |
| 15 days | [15-21] | 20 days |
| 560 days | [548-639] | 587 days |

| Original Sequence | Previous Date + Randomized Difference | De-identified Sequence |
|---|---|---|
| 1970-09-25 | 1970-04-17 | 1970-04-17 |
| 2001-04-08 | 1970-04-17 + 11,148 | 2000-10-24 |
| 2002-05-07 | 2000-10-24 + 398 | 2001-11-26 |
| 2002-08-12 | 2001-11-26 + 96 | 2002-03-02 |
| 2003-07-27 | 2002-03-02 + 345 | 2003-02-10 |
| 2003-08-11 | 2003-02-10 + 20 | 2003-03-02 |

| Original Sequence | De-identified Sequence | Difference = Original - De-identified | Connected Sequence | Connected + Difference | De-identified Connected Sequence |
|---|---|---|---|---|---|
| 2001-04-08 | 2001-04-23 | 15 days | 2001-04-10 | 2001-04-10 + 15 | 2001-04-25 |
| 2002-05-07 | 2002-05-26 | 19 days | 2002-05-09 | 2002-05-09 + 19 | 2002-05-28 |
| 2002-08-12 | 2002-08-30 | 18 days | 2002-08-12 | 2002-08-12 + 18 | 2002-08-30 |
| 2003-07-27 | 2003-08-10 | 14 days | 2003-07-28 | 2003-07-28 + 14 | 2003-08-11 |
| 2003-08-11 | 2003-08-30 | 19 days | 2003-08-11 | 2003-08-11 + 19 | 2003-08-30 |

1700

1900

Test Results Table

| ID | Patient ID | Test Date |
|---|---|---|
| 23456 | 111 | 2001-04-08 |
| 23457 | 111 | 2002-05-07 |
| 23458 | 111 | 2002-08-12 |
| 23459 | 111 | 2003-07-27 |
| 23460 | 111 | 2003-08-11 |

Follow-Up Tests Table

| ID | Test Results ID | Follow-up Date |
|---|---|---|
| 456 | 23457 | 2001-05-09 |
| 457 | 23457 | 2001-05-11 |

Consolidated Dates Table

| Source | Patient ID | Test Results ID | Follow-Up ID | Core Date |
|---|---|---|---|---|
| Test Results | 111 | 23456 | NULL | 2001-04-08 |
| Test Results | 111 | 23457 | NULL | 2002-05-07 |
| Follow-Up | 111 | 23457 | 456 | 2001-05-09 |
| Follow-Up | 111 | 23457 | 457 | 2001-05-11 |
| Test Results | 111 | 23458 | NULL | 2002-08-12 |
| Test Results | 111 | 23459 | NULL | 2003-07-27 |
| Test Results | 111 | 23460 | NULL | 2003-08-11 |

Visit Table

| ID | Patient ID | Admission Date | Discharge Date |
|---|---|---|---|
| 457 | 23457 | 2001-05-11 | 2001-05-28 |

Claims Table

| ID | Patient ID | Claim Date |
|---|---|---|
| 23456 | 23457 | 2001-05-11 |
| 23457 | 23457 | 2001-05-14 |
| 23458 | 23457 | 2001-05-18 |
| 23459 | 23457 | 2001-05-19 |
| 23460 | 23457 | 2001-05-28 |

Consolidated Dates Table

| Source | Patient ID | Visit ID | Claim ID | Core Date | Core Date ID |
|---|---|---|---|---|---|
| Visit | 23457 | 457 | NULL | 2001-05-11 | 1 |
| Claims | 23457 | NULL | 23456 | 2001-05-11 | NULL |
| Claims | 23457 | NULL | 23457 | 2001-05-14 | NULL |
| Claims | 23457 | NULL | 23458 | 2001-05-18 | NULL |
| Claims | 23457 | NULL | 23459 | 2001-05-19 | NULL |
| Claims | 23457 | NULL | 23460 | 2001-05-28 | NULL |
| Visit | 23457 | 457 | NULL | 2001-05-28 | 2 |

*Figure 20*

SYSTEM AND METHOD FOR SHIFTING DATES IN THE DE-IDENTIFICATION OF DATASETS

CROSS-REFERENCE TO RELATED APPLICATIONS

This application is a nonprovisional of U.S. Provisional patent application No. 62/002,461, filed May 23, 2014, which is hereby incorporated by reference for all purposes. Additionally, this application claims priority to Canadian Patent Application No. 2,852,253, filed May 23, 2014, which is hereby incorporated by reference for all purposes.

TECHNICAL FIELD

The present disclosure relates to databases and particularly to protecting privacy by de-identification of data stored in the databases.

BACKGROUND

Personal information is being continuously captured in a multitude of electronic databases. Details about health, financial status and buying habits are stored in databases managed by public and private sector organizations. These databases contain information about millions of people, which can provide valuable research, epidemiologic and business insight. For example, examining a drugstore chain's prescriptions or over the counter drug sales can indicate where a flu outbreak is occurring. To extract or maximize the value contained in these databases, data custodians must often provide outside organizations access to their data. In order to protect the privacy of the people whose data is being analyzed, a data custodian will "de-identify" information before releasing it to a third-party. De-identification ensures that data cannot be traced to the person about whom it pertains. In addition, there have been strong concerns about the negative impact of explicit consent requirements in privacy legislation on the ability to conduct health research. Such concerns are reinforced by the compelling evidence that requiring opt-in for participation in different forms of health research can negatively impact the process and outcomes of the research itself.

When de-identifying records, many people assume that removing names and addresses (direct identifiers) is sufficient to protect the privacy of the persons whose data is being released. The problem of de-identification involves those personal details that are not obviously identifying. These personal details, known as quasi-identifiers, include the person's age, sex, postal code, profession, dates of events such as for example date of birth, medical procedures or visits, ethnic origin and income (to name a few).

Data de-identification is currently a manual process. Heuristics are used to make a best guess how to remove identifying information prior to releasing data. Manual data de-identification has resulted in several cases where individuals have been re-identified in supposedly anonymous datasets. Accordingly, systems and methods that enable shifting dates in the de-identification of datasets remain highly desirable.

BRIEF DESCRIPTION OF THE DRAWINGS

Further features and advantages of the present disclosure will become apparent from the following detailed description, taken in combination with the appended drawings, in which:

FIG. 1 shows a table showing date sequence of medical claims converted to intervals;

FIG. 2 shows a table of sequence of intervals between claims converted back to dates by adding the running difference to the previous date;

FIG. 5 shows a table of date sequence for medical claims as de-identified intervals;

FIG. 6 shows a table of date sequence for medical claims de-identified;

FIG. 7 shows a table of date sequence for hospitalization, with a follow-up a few days later;

FIG. 8 shows a table of date sequence for hospitalization de-identified;

FIG. 9 shows a table of date sequence for medical claims as an expected running difference;

FIG. 14 shows a table of date sequences for medical claims converted to intervals, with DOB anchor;

FIG. 15 shows a table of date sequences for medical claims as de-identified intervals, with DOB anchor;

FIG. 16 shows a table of date sequence for medical claims de-identified, with DOB anchor;

FIG. 17 shows a table of date sequences for medical claims de-identified, with a connected sequence;

FIG. 19 shows date sequences for medical events, across multiple tables;

FIG. 20 shows date sequences for medical events, with multiple core dates in a single table;

It will be noted that throughout the appended drawings, like features are identified by like reference numerals.

DETAILED DESCRIPTION

Figure 3:
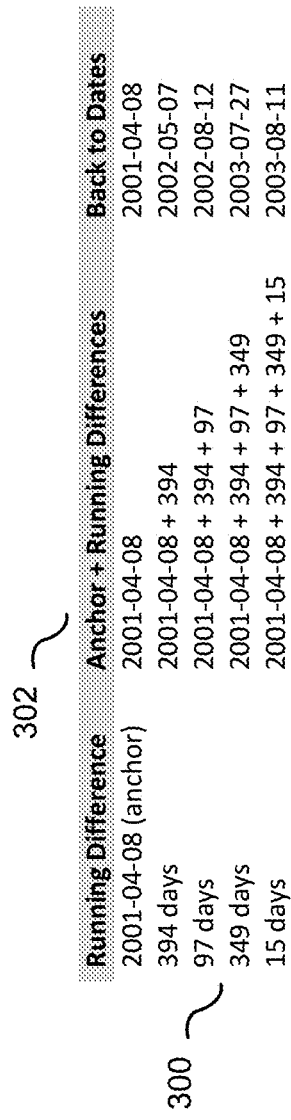
FIG. 3 shows a table of sequence of intervals between claims converted back to dates by adding up all the running differences to the anchor.

Embodiments are described below, by way of example only, with reference to FIGS. 1-24.

A system and method of performing date shifting with randomized intervals for the de-identification of a dataset from a source database containing information identifiable to individuals is provided. The de-identified dataset is retrieved comprising a plurality of records from a storage device. A selection of date fields from a user is received, the selection made from a plurality of variables present in the dataset, wherein the date fields are potential identifiers of personal information. A selection of date and interval generalizations from a user is received. The choice of date and interval generalization to use is determined based on meeting an acceptable risk threshold, as part of the de-identification of the dataset.

In accordance with an aspect of the present disclosure there is provided a method of dataset de-identification. The method comprising: retrieving a dataset having a plurality of entries containing personal identifying information; identifying date quasi-identifiers in the dataset for each of the plurality of entries; performing consolidation of a plurality of date events in the date quasi-identifiers and connected dates in the dataset; performing de-identification of the plurality of entries in the dataset including the date quasi-identifiers; performing risk analysis of the de-identified dataset to determine a risk metric; and iteratively performing de-identification of the date quasi-identifiers until a defined risk threshold is met relative to the determined risk metric; and storing the de-identification dataset.

In accordance with an aspect of the present disclosure there is provided for identifying an anchor date in a longitudinal sequence of the plurality of date events In accordance with an aspect of the present disclosure the anchor is the first date in the sequence of the plurality of date events.

In accordance with an aspect of the present disclosure the anchor date is a fixed date added to the longitudinal sequence of the plurality of date events.

In accordance with an aspect of the present disclosure the anchor is a front anchor date at a start of the longitudinal sequence to create a running difference between the plurality of date events in the longitudinal sequence to ensure the order of dates is preserved.

In accordance with an aspect of the present disclosure there is provided for generating a rear anchor date is a fixed date added to the end of the longitudinal sequence of the plurality of date events.

In accordance with an aspect of the present disclosure there is provided for randomizing the running difference within a level of generalization need for de-identification of the dataset.

In accordance with an aspect of the present disclosure the level of generalization is defined by a hierarchy based upon the risk analysis.

In accordance with an aspect of the present disclosure the level of generalization is defined by an interval of days, the level of generalization defining an upper and lower bound for randomization based upon a selected level of de-identification.

In accordance with an aspect of the present disclosure there is provided performing randomization of the running difference with the defined interval for each defined running difference within the longitudinal sequence.

In accordance with an aspect of the present disclosure the randomization is performed by a probability distribution.

In accordance with an aspect of the present disclosure the randomization is performed by a histogram matching the running difference.

In accordance with an aspect of the present disclosure there is provided summing a de-identified running difference to a de-identified anchor date to generate a sequence of de-identified dates therefore preserving the longitudinal order of date events.

In accordance with an aspect of the present disclosure there is provided identifying one or more date events as connected dates to an associated quasi-identifier date wherein the connected dates are modified based upon the de-identified running difference.

In accordance with an aspect of the present disclosure the connected dates are modified by shifting them by the same number of days as the de-identified date events they are associated with.

In accordance with an aspect of the present disclosure there is provided generating a consolidated date table comprising quasi-identifier date events from a plurality of data tables to generate a respective single quasi-identifier date to represent the plurality of date events.

In accordance with an aspect of the present disclosure there is provided adding connected dates to the consolidated date table with the quasi-identifier date they are associated with.

In accordance with an aspect of the present disclosure there is provided generating associating each quasi-identifier date event and connected dates with keys to originating date events wherein the keys identify a row within a source table of the dataset.

In accordance with an aspect of the present disclosure there is provided generating a core identifier for quasi-identifier date events, the core identifier defining a column where the quasi-identifier date resides with the source table.

In accordance with an aspect of the present disclosure there is provided performing de-identification using the consolidated quasi-identifier date events by generating a destination table corresponding to a respective source table in the dataset using the generated keys and core identifiers to map the randomized date events to maintain the respective longitudinal sequences.

In accordance with an aspect of the present disclosure the risk assessment is determined based upon a level of k-anonymity determined for the dataset.

In accordance with an aspect of the present disclosure performing de-identification of the dataset is performed by an optimal lattice method.

In accordance with an aspect of the present disclosure randomization is performed by a uniform probability distribution, linear probability distribution or an exponential probability distribution.

In accordance with an aspect of the present disclosure the probability distribution is selected based upon a drift threshold where the drift threshold is an anchor generalization interval minus a generalized difference interval wherein the distribution is selected to provide a date drift less than the threshold while achieving a desired risk threshold.

In accordance with another aspect of the present disclosure there is provided a system for Shifting Dates in the De-Identification of Datasets, the system comprising: a storage device for storing a dataset; a processor coupled to the storage device; and a memory coupled to the processor for executing a method of shifting dates in the de-identification of datasets, the method comprising: retrieving a dataset having personal identifying information; identify date quasi-identifiers in the dataset; performing consolidation of a plurality of date events in the date quasi-identifiers and connected dates in the dataset; performing de-identification of the dataset including the date quasi-identifiers; performing risk analysis of dataset to determine a risk metric; and iteratively performing de-identification of the date quasi-identifiers until a defined risk threshold is met relative to the determined risk metric; and storing the de-identification dataset.

In accordance with another aspect of the present disclosure there is provided a computer readable memory containing instructions which when executed by a processor perform a method of shifting dates in the de-identification of datasets, the method comprising: retrieving a dataset having personal identifying information; identify date quasi-identifiers in the dataset; performing consolidation of a plurality of date events in the date quasi-identifiers and connected dates in the dataset; performing de-identification of the dataset including the date quasi-identifiers; performing risk analysis of dataset to determine a risk metric; and iteratively performing de-identification of the date quasi-identifiers until a defined risk threshold is met relative to the determined risk metric; and storing the de-identification dataset.

When datasets are released containing personal information, potential identification information is removed to minimize the possibility of re-identification of the information. However there is a fine balance between removing information that may potentially lead to identification of the personal data stored in the database versus the value of the database itself. A commonly used de-identification criterion is k-anonymity, and many k-anonymity methods have been developed. With k-anonymity, an original data set containing personal information can be transformed so that it is difficult to determine the identity of the individuals in that data set. A k-anonymized data set has the property that each record is similar to at least another k−1 other records on the potentially identifying variables. For example, if k=5 and the potentially identifying variables are age and gender, then a k-anonymized data set has at least 5 records for each value combination of age and gender. The most common implementations of k-anonymity use transformation techniques such as generalization, global recoding, and suppression.

Any record in a k-anonymized data set has a maximum probability 1/k of being re-identified. In practice, a data custodian would select a value of k commensurate with the re-identification probability they are willing to tolerate—a threshold risk. Higher values of k imply a lower probability of re-identification, but also more distortion to the data, and hence greater information loss due to k-anonymization. In general, excessive anonymization can make the disclosed data less useful to the recipients because some analysis becomes impossible or the analysis produces biased and incorrect results.

Ideally, the actual re-identification probability of a k-anonymized data set would be close to 1/k since that balances the data custodian's risk tolerance with the extent of distortion that is introduced due to k-anonymization. However, if the actual probability is much lower than 1/k then k-anonymity may be over-protective, and hence results in unnecessarily excessive distortions to the data.

The description below is provided in the context of a healthcare example, however the disclosed system and methods apply to the de-identification of any sequence dates representing personal information for example financial transactions. Now the dates of Subject 1's healthcare visits are identifying, and so are the intervals between those dates (i.e., the number of days between visits). The challenge is to de-identify the dates—and the intervals between dates—in such a way that the order of visits is maintained. FIG. 1 shows Subject 1's sequence of medical claims 102 in table 100, and the sequence of intervals 104 between those medical claims. The first ordered date in Subject 1's medical claims, 2001-04-08, is used as an anchor 202, shown in FIG. 2,—adding the number of days between visits gives you back the original dates. There are two ways to get back to the original dates. The first, as shown in table 200 of FIG. 2, adds the running difference 204 to the previous date. The second, as shown in table 300 in FIG. 3, adds up all the running differences 302 to the anchor providing the same result.

Figure 4:
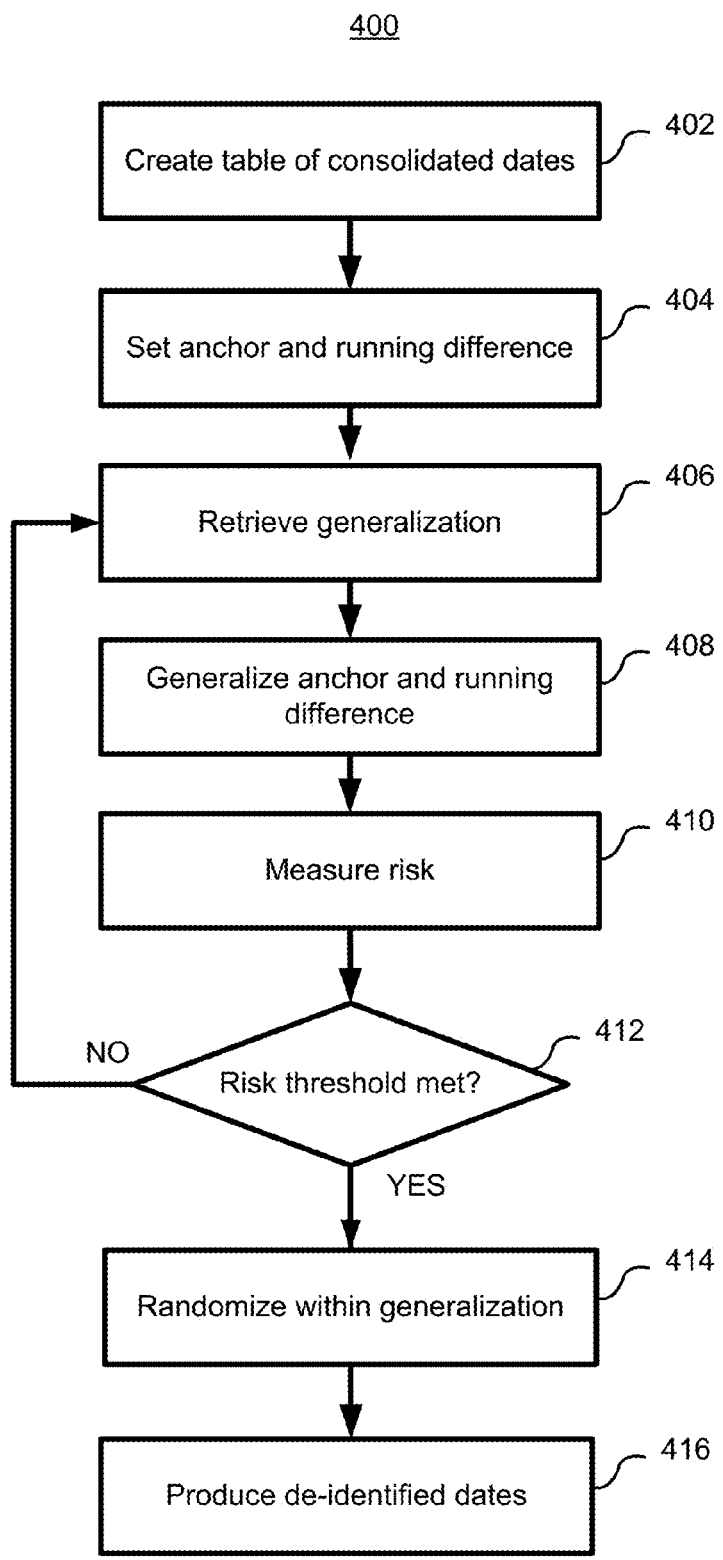
FIG. 4 shows a method of date shifting.

Referring to FIG. 4, to de-identify the running difference to a de-identified sequence of dates a table is created of consolidated dates (402). This table identifies the person the dates belong to, and the tables that contain the dates (through a sequence of keys). Anchor and running difference are set (404), as discussed above. A selection of date and interval generalizations from a user is received. The generalization is determined for the anchor and the generalization used for the intervals between dates—this will determine the accuracy of the de-identified sequence of dates. The hierarchy specified by a user is utilized to determine the generalization that is considered (406). The first level considered is the original dates (408), and the subsequent levels are be selected from least to most generalized (e.g., week anchor and 3-day intervals, or month anchor and 7-day intervals).

The generalizations used for the anchor and the intervals are determined by performing a risk assessment of a dataset de-identified from a source database containing information identifiable to individuals as provided in U.S. Pat. No. 8,316,054 B2 hereby incorporated by reference in its entirety. The risk assessment is performed to assess different attack risks (410). If the desired risk threshold is not exceeded (Yes at 412), the de-identified dates can be published following being randomized with the generalization (414) and the de-identified dates are produced (416). If the threshold is exceeded, (No at 412), the dates can be further de-identified (e.g., using the next generalization hierarchy provided by a user).

Note that re-identification risk is not considered in isolation of other quasi-identifiers in the dataset, however for the purposes of this description the de-identification is described relative to quasi-identifier dates. The method by which it can be determined if dates need to be further de-identified can use a lattice to define optimal anonymization strategies such as for example U.S. Pat. No. 8,326,849 B2 hereby incorporated by reference in its entirety. The latter system and method for optimizing the de-identification of data sets can extend to de-identify longitudinal data. The lattice optimization can be performed by determining equivalence classes for one or more quasi-identifiers defined within the dataset, the equivalence classes based upon ranges of values associated with each quasi-identifier. A lattice is generated comprising a plurality of nodes, each node of the lattice defining an anonymization strategy by equivalence class generalization of one or more quasi-identifiers and an associated record suppression value, the plurality of nodes in the lattice arranged in rows providing monotonically decreasing level of suppression from a bottom of the lattice to a top of the lattice. A solution set is generated for one or more generalization strategies for the plurality of nodes of the lattice providing k-anonymity, by performing a recursive binary search of the lattice commencing from a left most node in a middle row of the lattice, each of the one or more generalization strategies being defined by nodes lowest in the respective generalization strategy within the lattice, each providing a least amount of equivalence class generalization of one or more quasi-identifiers and the associated record suppression value of the dataset. One or more optimal nodes is determined from the solution set the one or more optimal nodes lowest in height in the one or more generalization strategies, the one or more optimal nodes providing the least amount of generalization and suppression within the solution set of one or more records of the dataset, the optimal nodes determined to provide minimal information loss using a non-uniform entropy metric.

A risk assessment on a data set that included Subject 1's profile can identify that the anchor date needs to be generalized to month, and the running difference to 7-day intervals. Once the running difference has been generalized, random values are sampled within the generalizations (414) as shown in table 500 of FIG. 5.

Once sequence of intervals as been randomized, they can be converted back into a sequence of dates (416) as was shown using the original sequence of dates for Subject 1's medical claims, once they were converted to a running difference, in FIG. 2 and FIG. 3. Therefore the same process occurs, only now the randomized values are utilized. The dates can be converted back by adding the randomized difference to the previous de-identified date, shown in table 600 in FIG. 6.

Depending on the table, a patient could have dates that repeat themselves in the original sequence of dates. Visit dates to a doctor probably won't repeat as a doctor visit is only likely once in a day. However, if care is transferred to a specialist at the same institution (e.g., from ER to cardiac care) multiple medical claims on the same day (e.g., operative care and post-operative care) may occur. Same day events should not be split across different days.

In addition there may be dates that are only one-day apart. The best example of this is a hospitalized visit, in which the patient has to stay a few days (i.e., an in-hospital patient, or inpatient). Now imagine randomizing the dates of such a visit, and not keeping them one-day apart, with the end result that the patient seems to have been in and out of hospital for a week.

For the sake of maintaining the best quality data, generalization of the running difference is started between dates at day 2. That way those dates with a running difference of 0 or 1 day apart will be shifted together, and not split up. This is performed by defining the generalization with the interval range (7 days), and the starting point (day 2)—shortened by being identified as "7:2", as shown in table 700 in FIG. 7.

With the generalization scheme used for Subject 1's dates of hospitalization shown in FIG. 7, all that's left is to pick random values from the generalized differences and create the de-identified sequence. The anchor will be some random day in 2004-05, for example 2004-05-22, and a generalized difference of 0 or 1 day will not change since it's not in a range. The only date left is in the range [2-8], which we'll give the random value of 4 days. The de-identified sequence is given in table 800 in FIG. 8.

Randomized difference between dates from a uniform distribution can be drawn such that the expected value for any de-identified difference is the midpoint of the generalization (i.e., the mean of a uniform distribution). Based on a statistical property of expected values, the expected sum of the running difference ($E\Sigma(D_i)$), where $D_i$ is the ith difference) is the sum of the expected running difference ($\Sigma E(D_i)$).

Take Subject 1's running difference of dates for his medical claims as an example, as shown in table 900 in FIG. 9, the length of service—i.e., the number of days from first to last claim—is the sum of the running difference ($\Sigma(D_i)$), a total of 855 days. Based on the generalization of the running difference, the expected length of service ($E\Sigma(D_i)$) is the sum of the expected running difference ($\Sigma E(D_i)$), a total of 856 days.

Another patient, Subject 2, with the same running difference of dates will have the same expected length of service. Of course, the randomized running difference, and therefore the randomized length of service, for Subject 1 and Subject 2 will be different. But the expected difference will not, because it's the average across many patients with the exact same running difference of dates.

The running differences of the Subject 1's, Subject 2's, and Subject 3 likely won't have running differences that are uniformly distributed when they're combined, whereas the random values are drawn from a uniform distribution.

Figure 10:
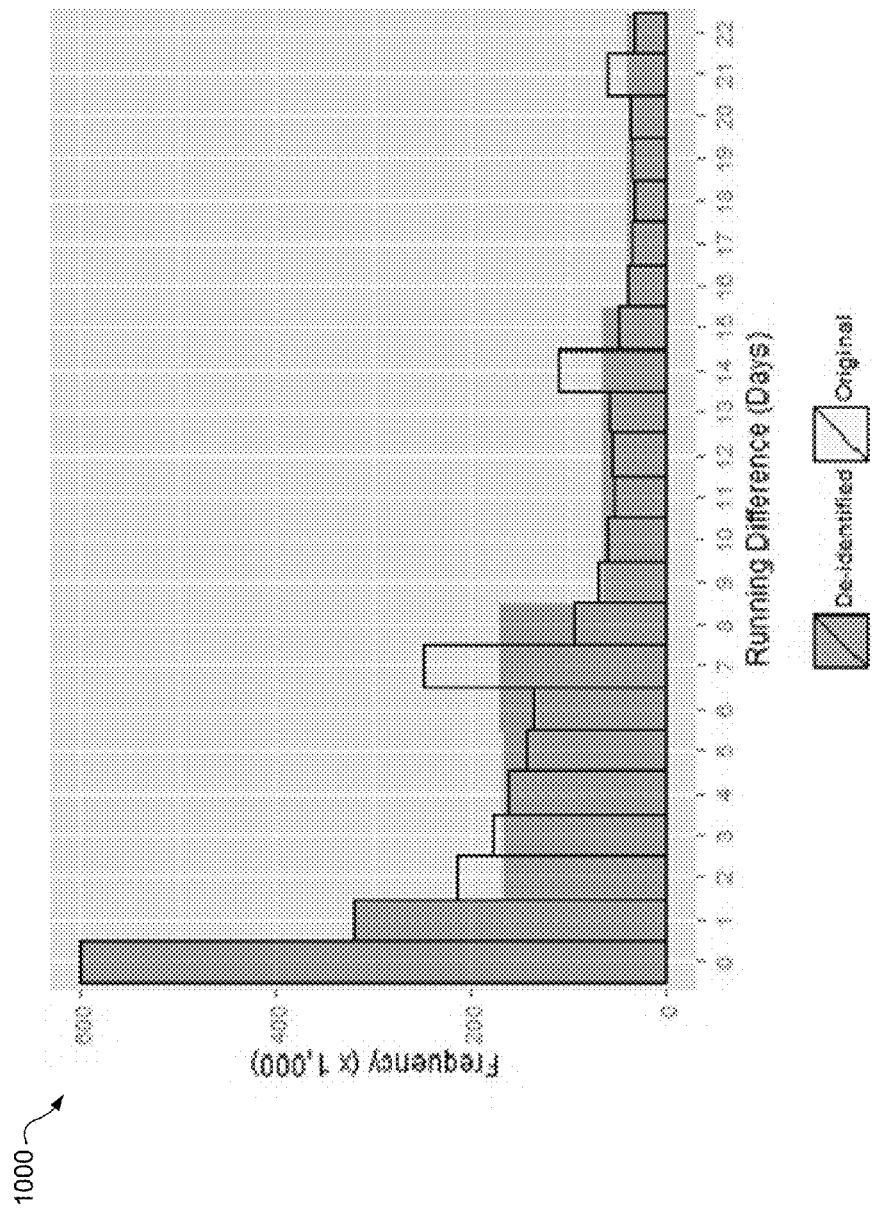
FIG. 10 shows a histogram of running difference before and after date shifting (with generalization "7:2")

Consider the histogram 1000 in FIG. 10, which counts the number of times a running difference comes up in a data set of Subject 1's, Subject 2's, and Subject 3. Note how the frequency after de-identification is the mean frequency over the respective generalized running difference. The frequency of 0 and 1 day don't change, because they haven't been randomized. But from [2-8], the running difference after date shifting has been averaged out across all days.

Sampling can occur from a different distribution to generate the randomized running difference. However, the most natural method would be to use the original histogram rather than a uniform distribution. This would allow for exact matching of the histograms: the original histogram of the running difference, and the de-identified running difference. This option is not shown in the figures as the overlap would cause them to look like a single histogram, rather than two histograms.

Figure 11:
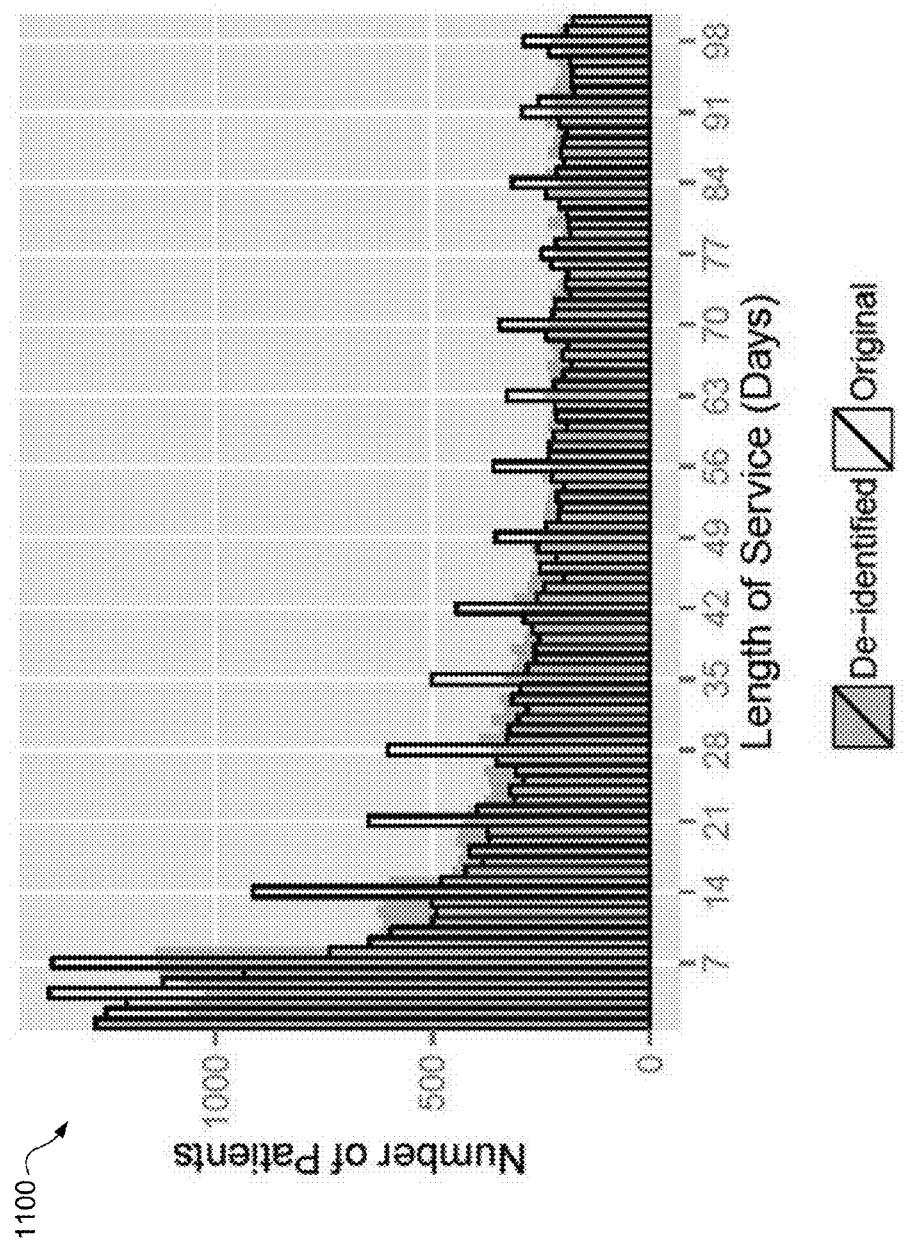
FIG. 11 shows histogram of patients' length of service.
Figure 12:
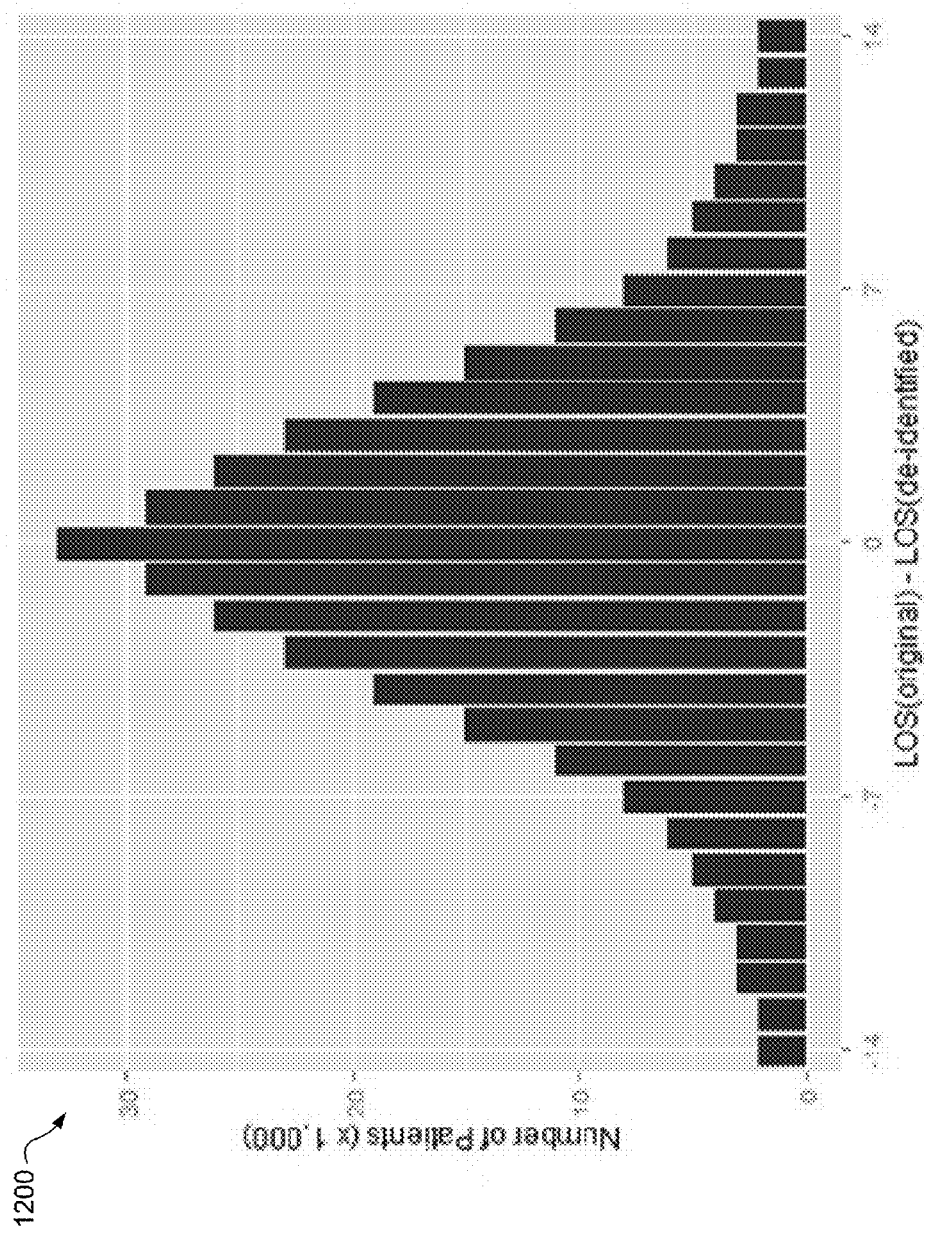
FIG. 12 shows a histogram of Length of service before and after date shifting.

Now consider the histogram of patient length of service in FIG. 11, which is defined as the sum of a patient's running difference. From the first hundred days, the number of patients with specific LOS is very similar to the original data. The "spikes" at multiples of 7 days in the original data are the same shown in FIG. 10, and are lost in the de-identified data due to the averaging caused by uniform sampling. A Kolmogorov-Smirnov test can be used for shape comparison with no statistically significant difference between the histograms.

Although not shown, the tail of the histogram 1100 for LOS over 100 days looks the same as what is shown FIG. 11 from about 50 to 100 days (i.e., a long tail that's pretty flat, before and after anonymization). If a cut-off of Jul. 15, 2013 is considered as the definition of "today", less than 0.03% of the 24 million dates were shifted into the future not counting dates that were already in the future.

The difference in LOS before and after de-identification can also be examined to see whether date shifting lengthens or shortens the LOS for patients. LOS is defined as the sum of the running difference between a patient's sequence of dates. For example, if a patient has LOS of 100 days before date shifting, and LOS of 90 days after date shifting (due to de-identification of the running difference), the difference in LOS is −10 days (i.e., LOS was shortened by 10 days).

The mean shift in dates is expected to be zero, meaning LOS will be the same before and after date shifting. As shown in histogram 1200 in FIG. 12 the mean difference in LOS before and after date shifting is 0.2 days. Furthermore, 80% of patients have an LOS after date shifting that is within plus or minus 9 days of the original LOS, 90% within plus or minus 14 days, and 95% within plus or minus 20 days of the original LOS (due to long tails in the distribution).

The difference in LOS follows a normal distribution for the 90% of patients shown in the histogram. Therefore, the distribution is randomly generated. The tails of the distribution are long, but this is commonly seen in real data, and expected due to biases in the sequence of dates for these patients with a very large number of entries in the database.

Figure 13:
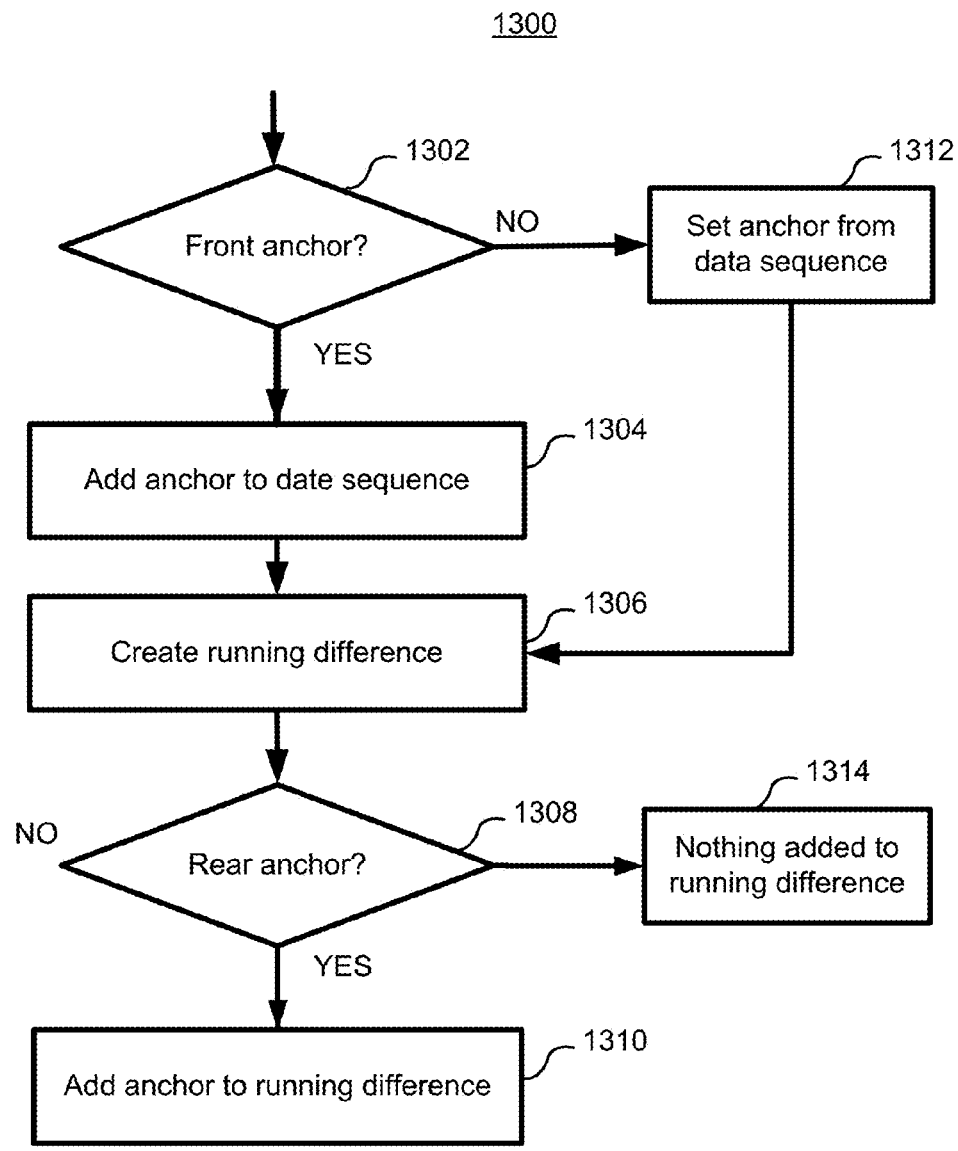
FIG. 13 a method of setting an anchor date and determining running differences.

Referring to method 1300 in FIG. 13, date shifting, uses by default the first date in a patient's longitudinal sequence as the front anchor (Yes at 1302), the anchor is set from the date sequence (1312). However, another front anchor may be utilized (No at 1302), an anchor is added to the date sequence (1304) such as date of birth (DOB) or the diagnosis of a particular disease, captured in another table. The running difference based upon the new anchor is created (1306). If a rear anchor is added (Yes at 1308) the anchor can be added to the running difference (1310), such as date of death (DOD), also captured elsewhere (although possibly in the same table as the front anchor). If no rear anchor is added (No at 1308), no additional entry is added to the running difference (1314).

Level 1 quasi-identifiers are fields that don't change over the course of a person's life (e.g., fixed demographics), and therefore pose a higher risk of re-identification; level 2 quasi-identifiers are fields that do change over the course of a person's life (e.g., variable demographics and longitudinal health or financial data). As such, level 1 quasi-identifiers often need to be generalized more than level 2 quasi-identifiers in the risk assessment.

Whether a front or rear anchors is level 1 or level 2 is important for the risk assessment. If both are level 2 (for example, the first and last dates in a longitudinal sequence of events) then these dates are added to the sequence to be date shifted. If either are level 1, then they must be added to the risk assessment as a separate entity to the date shifting, and the generalization used for these dates will be received from the user separately from the level 2 dates.

Risk assessment, as shown in U.S. Pat. No. 8,316,054 B2 hereby incorporated by reference in its entirety, may be performed based upon the generalization selected. Risk assessment will be described in relation to the date shifting by assuming determining the generalization for level 1 front and rear anchors.

Referring to Subject 1's sequence of dates again, and this time a date of birth (DOB) is added, 1970-09-25, as a level 1 front anchor, as shown in table 1400 of FIG. 14 (ignore the rear anchor for now; we'll get to it shortly). Whereas the (level 2) anchor was generalized to month, now it may be in years.

Because level 1 front anchor date is added to the sequence, the first running difference after the anchor must be treated as a level 1 quasi-identifier since they're directly linked. For example if this first running difference is Subject 1's first diagnosis of some disease—the first running difference is therefore the age of first diagnosis. It must be determined that there are a sufficient number of patients in the data set that have also had their first diagnosis at around 30-years of age to protect Subject 1's identity.

The rear anchor also poses a new challenge, because although it's at the end of a longitudinal sequence, it's also level 1 from DOB. In other words, the best representation of DOD is actually the sum of the running difference, i.e., the age at death. However the level 2 running difference of DOD must be kept so that the DOD isn't accidently randomized to be a date before the last service date. To address this, the generalization of the rear anchor is determined based on its level 1 representation from the front anchor. This representation of the rear anchor is highlighted in table 1400 of FIG. 14, because it's not actually part of the date sequence, although it is part of the risk assessment. In this case that means risk mitigation is performed using the level 1 value 12,568 days (i.e., DOD minus DOB). Once the generalization scheme for the level 1 rear anchor is obtained, it is applied to the level 2 running difference of the rear anchor, which in this case is 560 days (i.e., DOD minus last level 2 service date).

A risk assessment on a data set that included Subject 1's profile found that the front anchor (DOB) needs to be generalized to year, the first level 1 running difference to quarter, the level 2 running difference to 7-day intervals, and the level 2 rear anchor (DOD) to quarter. Once the running difference is generalized, we then uniformly sample random values within the generalizations as shown in table 1500 of FIG. 15.

Just like before, now that a randomized sequence of intervals is obtained, they can be converted back into a sequence of dates by adding the randomized difference to the previous de-identified date, shown in table 1600 of FIG. 16.

Now if DOB is removed as a front anchor, or suppressed as part of the de-identification, then interval from front anchor to rear anchor does not need to be considered. The rear anchor is, however, a level 1 field, and must therefore be considered at a higher level of risk. This implies that the level of generalization applied to this date may be greater than sequence of level 2 dates in the person's longitudinal profile.

In many database tables there will be dates that are connected in some way to the original sequence of dates that we wish to de-identify. For example, there may be log dates that represent when the information was recorded. In many systems this will be the same as the original visit date, but the dates may also reflect changes made after the visit. These connected dates are highly correlated to the original sequence, and may be used to infer the original sequence. The connected date fields are received from a user.

To maintain referential integrity, the connected dates are shifted by the very same amount as the original sequence. One way to look at this is to apply the difference between the original and connected sequence of dates across rows to the de-identified sequence. For example, the first date in the original sequence to be de-identified in table 1700 of FIG. 17 is 2001-04-08. Along the same row there is a connected date of 2001-04-10. The difference between the two is +2 days. Once the original sequence is de-identified, the first row of the de-identified sequence is 2001-04-23, and the de-identified connected sequence is 2001-04-23+2=2001-04-25.

Another way to look at this is to update the connected sequence by the same number of days as the original sequence relative to its previous value in the same row. This is the process shown in table 1700 of FIG. 17. That is, for each row, the difference is calculated between the original sequence and the de-identified sequence. Then update every connected date field by the same number of days to produce de-identified versions of the connected dates.

This can be done for any sequence of connected dates in the same table. Note, however, that empty cells in the original sequence of dates (i.e., from original missingness) or in the de-identified sequence of dates (i.e., from suppression) will be propagated to the connected dates in the same row. This is to ensure inferences cannot be drawn to the original sequence of dates which is being de-identified.

The method described thus far can be extended to any number of tables in a database. The core quasi-identifier date in a table is the field that best represents the date of an activity in that table—it is the core date that is date shifted. For example, the core date field for a table of test results would be the date the test was conducted. All other dates that relate to the person can then be considered as connected dates.

Figure 18:
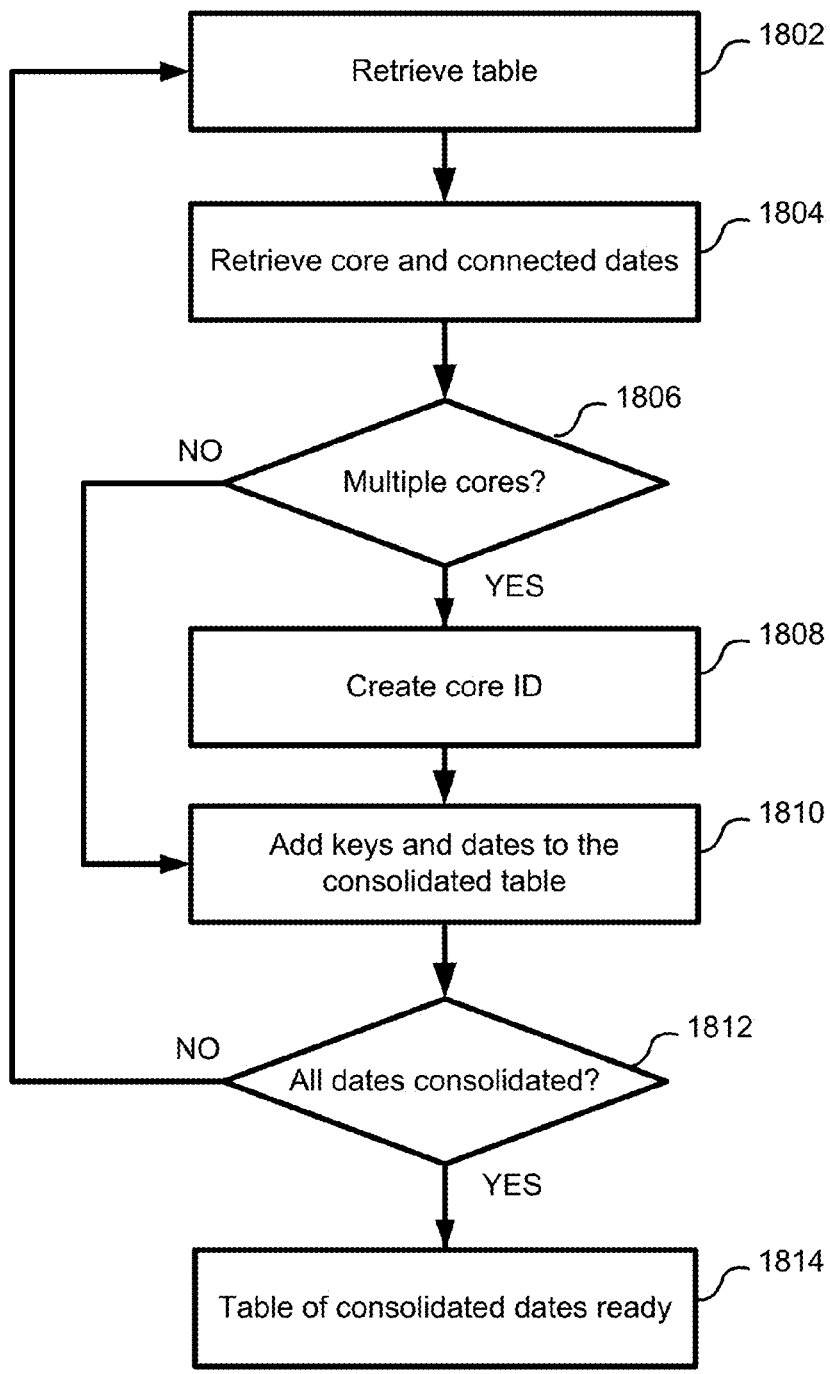
FIG. 18 shows a method for creating a table of consolidated dates.

FIG. 18 show a method 1800 of creating a table of consolidated dates. The first table is retrieved (1802) that will receive date shifting and all the core dates and connected dates for this table are retrieved (1804). If there is multiple core dates (Yes at 1806) then core date identifiers are created (1808) to track the different core dates per table, so that versions can be copied into the de-identified database. Keys or identifiers and dates are added to consolidated table (1810). For example, Subject 1's test results can be shown in one table, and follow-up test results in another. The keys for each core date and each table are copied to a new consolidated table of core dates. Date shifting is then applied to the consolidated column of core dates, following the exact same process that was described in the previous sections including the de-identification of connected dates test results in another, as shown in table 1900 of FIG. 19.) If there are not multiple core dates (No at 1806) the keys and dates are added to the consolidated table (1810). The consolidated table preserves the original keys to the tables where these dates were copied from so that the correct de-identified dates can be added back into the original tables (to replace the previous core date column, or as a new de-identified core date column). The process is repeated for each table in turn (No at 1812) until all dates are consolidated (Yes at 1812) and the table of consolidated dates is completed (1814).

This approach of having one core date per table, and multiple connected dates within each table, may not always be applicable depending on how the dates are organized. Regardless of the approach the risk of re-identification must be below the risk threshold, and maintain the referential integrity between quasi-identifier date fields.

For example, a visit table with a column could be provided for the admission date (a quasi-identifier), and a column for the discharge date (a quasi-identifier), and a claims table with a claim date (a quasi-identifier). If the admission date is chosen as the core date for the visit table, and the discharge date is chosen as a connected date, then the length of stay (i.e., the number of days from admission to discharge, a quasi-identifier) will not be randomized. Furthermore, the interval between claims may be randomized, resulting in a different length of stay from admission to discharge.

To extend the process to incorporate multiple quasi-identifier date fields in the same table, multiple core date fields can be defined in the same table, so that they are consolidated into a single column. That way the date shifting process with randomized intervals is applied to the entire sequence of these core dates, as shown in table 2000 of FIG. 20. A core date ID is created, to track the different core dates per table, so that versions can be copied into the de-identified database.

Connected dates, such as log date, are treated in the same way described earlier. That is, for each row, the connected dates are updated by the same number of days as the original sequence relative to its previous value.

Figure 21:
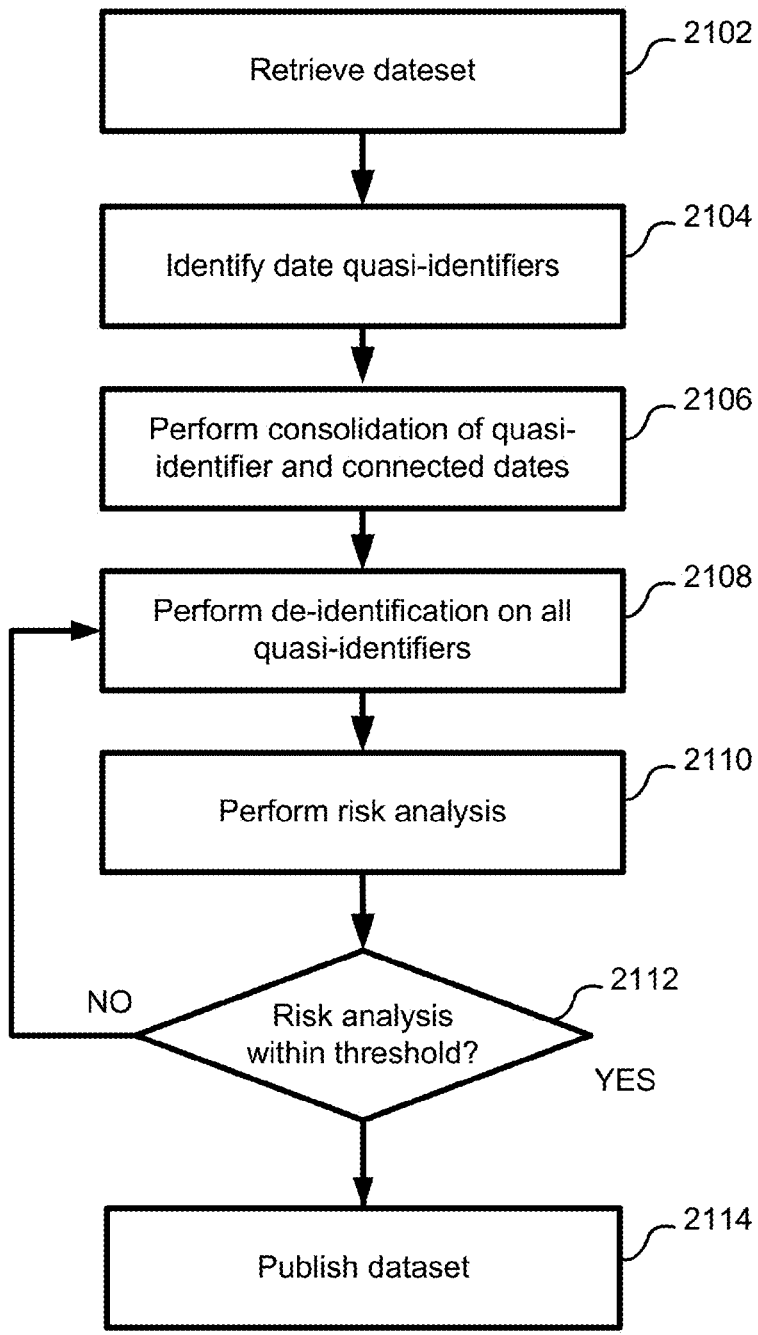
FIG. 21 shows a method of de-identifying a dataset.

FIG. 21 show a method 2100 of shifting date in the de-identification of datasets. The dataset for de-identification is retrieved (2102). The dataset may be part of a database or a complete database containing personal identifiable information. The quasi-identifiers are identified within the dataset (2104), for example identification of date fields that can be associated with a longitudinal sequence with a particular personal identifier in the dataset. The quasi-identifiers in the dataset associated with the personal data are consolidated (2106) with associated dates which may be provided in the same table or associated tables. De-identification is performed on all the identified quasi-identifiers in the dataset (2108). The de-identification process may include de-identifying non-date based quasi-identifiers by one or more generalization strategies. Risk analysis is then performed (2110) to generate a risk metric, such as based upon a determined a level of k-anonymity. The risk analysis metric is compared with a defined threshold. If the risk metric is below the threshold (Yes at 2112) the dataset can be published (2114). If the risk metric is above the threshold (No at 2112) additional de-identification of the dataset may be performed (2108). If the risk metric is below the threshold the de-identification of the dataset may be further refined by an optimization algorithm to reduce any over generalization. The publishing of the de-identified data may comprise generating a destination table corresponding to a respective source table in the dataset using the generated keys and core identifiers to map the randomized date events to maintain the respective longitudinal sequences. The date shifting de-identification method may apply the same generalization to all persons (global recoding), however it can be applied to perform generalization to specific groups (local recoding). So in the latter one person may get a randomization in an interval of size 5 days, and another may get it in an interval of size 3 days, depending on how identifiable their profile is.

Figure 22:
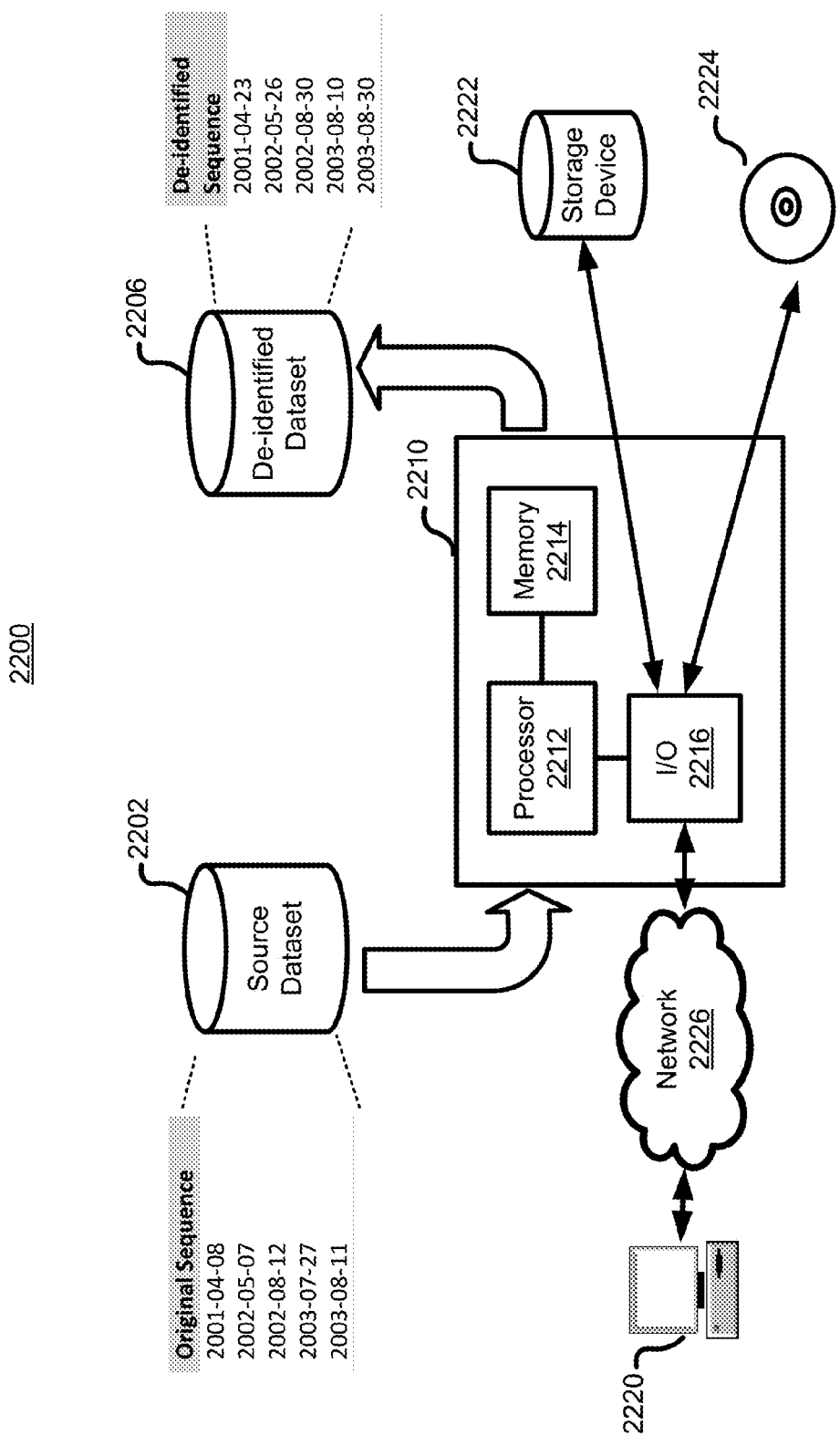
FIG. 22 shows system for optimizing de-identifying of a dataset.
Figure 23:
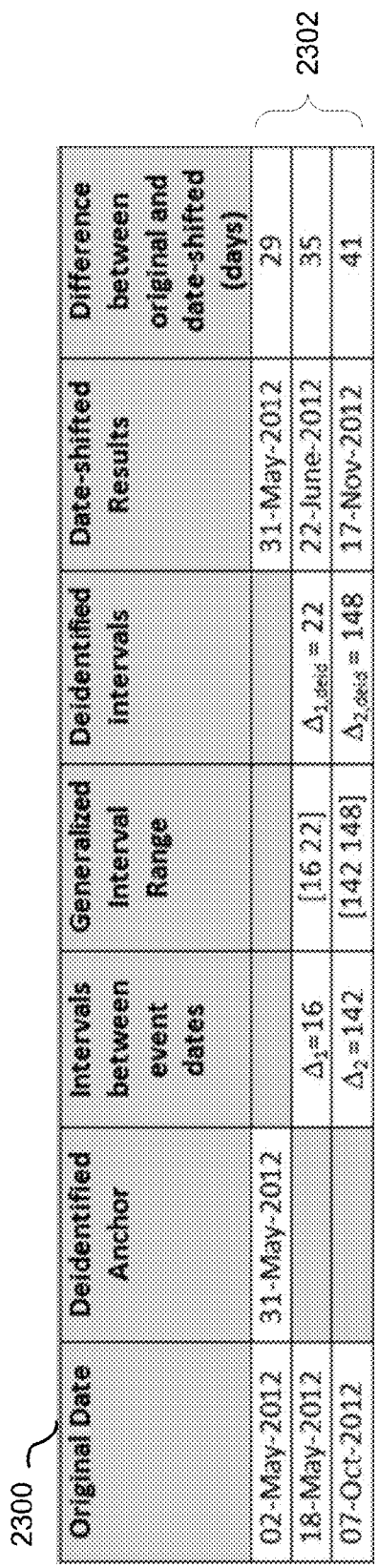
FIG. 23 shows a table with date shifting drift.

FIG. 22 provides a system 2200 for optimal de-identification as used in connection with the above described method. A computer or server 2210 providing at least a processor 2212, memory 2214 and input/output interface 2216, implements the code for executing the de-identification process. A source dataset 2202 is stored on computer readable storage memory which may reside locally or remotely from processing unit 2210. The dataset is processed by the computer 2210 to provide the optimal de-identification of quasi-identifiers based input provided identifying the level of k-anonymity and suppression suitable to the dataset. Generalization strategies and levels of suppression can also be provided through template files, user selection or input through interaction with the computer 2210, either directly through input devices such a keyboard/mouse or remotely through a connected computing network 2226. External storage 2222, or computer readable memory such as non-volatile ram, compact disc, digital versatile disc or other removable memory devices 2224 may be used to provide the instructions for execution of the de-identification method or provide input for generalization or suppression parameters via I/O unit 2216. Execution of the method on processor 2212 generates a de-identified dataset 2206 or provides the resulting parameters to generate the dataset by other computing methods.

It can be shown experimentally and theoretically that for patients with a large number of longitudinal records (i.e. a large number of entries in the consolidated dates table), it is possible that the use of a uniform distribution in performing the generalization as in FIG. 4, can result in differences between the original and de-identified dates in excess of the anchor generalization interval. This difference is termed date shifting drift, and it is possible that this difference might compound over time. An example of how this might arise is shown table 2300 of FIG. 23. The difference between the original and date-shifted dates 2302 increases over the span of the records.

Figure 24:
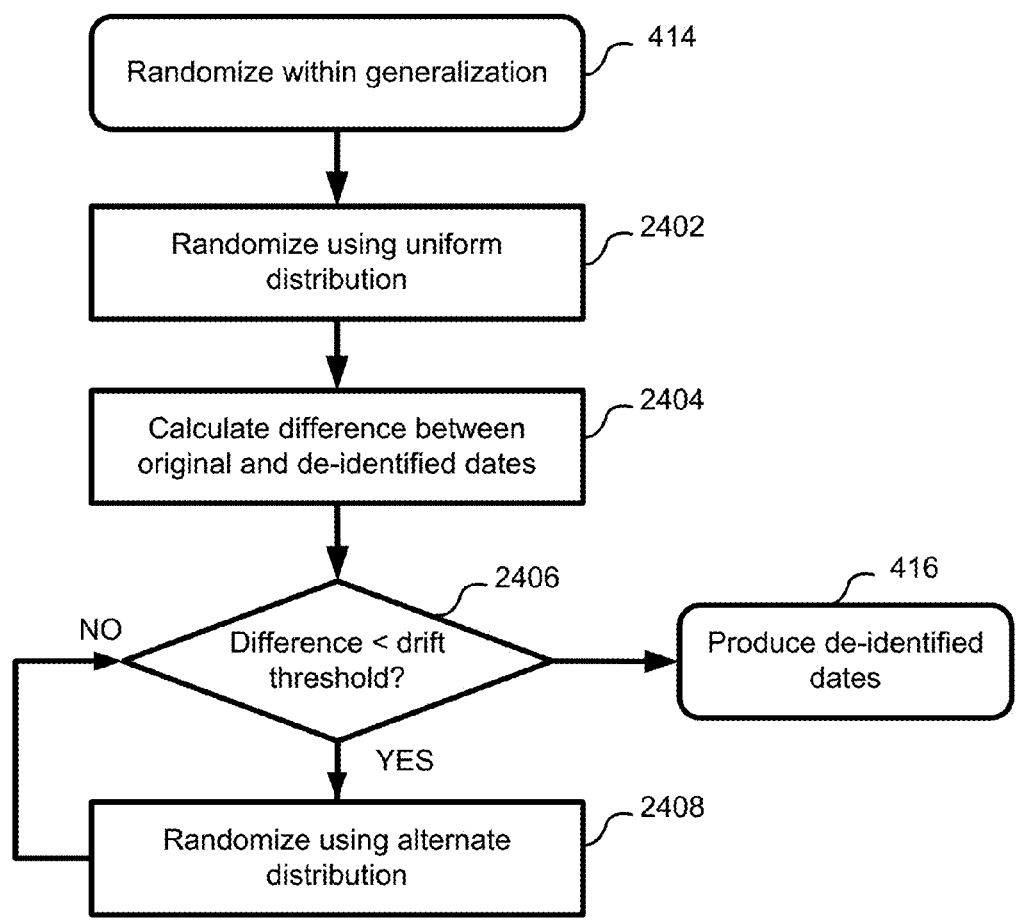
FIG. 24 a method of date shift correction.

Date shifting drift can be rectified through the use of a modification to date shifting method of FIG. 4 to incorporate drift correction method shown in FIG. 24. The method is modified to include another sequence during the method, which tracks the current difference between the original and de-identified dates. This allows the recognition of when date shifting is likely to produce a de-identified interval that would push it out of bounds (i.e. out of the excess of the anchor generalization interval). The distribution can be modified to change the date shifts into an acceptable range by modifying the random distribution from which the de-identified interval is drawn. A key difference with the modified method is that the de-identified dates need to be calculated sequentially. By compensating for date shift drift the order of dates is preserved in the de-identified sequence, and that the difference between original and de-identified dates will lie within the anchor generalization period.

Referring to FIG. 24, when randomizing the generalization (414) the dates can be randomized with a uniform distribution (2402). The difference between original and de-identified dates is calculated (2404). The determined difference is compared to a drift threshold. The drift threshold is the anchor generalization interval minus the generalized difference interval. For example, for anchor generalization interval=month and generalized difference interval=week, the threshold would be 31 days−7 days=24 days. If the running difference exceeds this threshold (YES at 2406), the alternate distribution is selected (2408). If the running difference does not exceed this threshold (NO at 2406) the uniform distribution is utilized to produce the de-identified dates (416). The alternate probability distribution may for example be an exponential distribution or a linear distribution (decreasing). The alternate distributions may be iteratively selected until the difference is within the threshold. If the running difference continues to exceed the threshold after the parameters of the distribution (lambda in the exponential distribution or slope in the linear) can be selected so that choosing a value that put the shift outside the threshold would not be possible.

Each element in the embodiments of the present disclosure may be implemented as hardware, software/program, or any combination thereof. Software codes, either in its entirety or a part thereof, may be stored in a computer readable medium or memory (e.g., as a ROM, for example a non-volatile memory such as flash memory, CD ROM, DVD ROM, Blu-ray™, a semiconductor ROM, USB, or a magnetic recording medium, for example a hard disk). The program may be in the form of source code, object code, a code intermediate source and object code such as partially compiled form, or in any other form.

It would be appreciated by one of ordinary skill in the art that the system and components shown in FIGS. 1-24 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims.

The invention claimed is:

1. A method of dataset de-identification, the method comprising:
   retrieving, by a server, a dataset having a plurality of entries containing personal identifying information;
   identifying by the server, date quasi-identifiers in the dataset for each of the plurality of entries;
   performing, by the server, consolidation of a plurality of date events in the date quasi-identifiers and connected dates in the dataset;
   identifying, by the server, an anchor date in a longitudinal sequence of the plurality of date events, wherein the anchor date is a front anchor date at a start of the longitudinal sequence to create a running difference between the plurality of date events in the longitudinal sequence to ensure an order of dates is preserved;
   selecting, by the server, a probability distribution based upon a drift threshold, wherein the drift threshold is an anchor generalization interval minus a generalized difference interval and, wherein the probability distribution is selected to provide a date drift less than the threshold while achieving a desired risk threshold;
   performing, by the server, randomization of the running difference with a defined interval for each defined running difference within the longitudinal sequence, wherein randomization is performed by the probability distribution;
   performing, by the server, de-identification of the plurality of entries in the dataset including the date quasi-identifiers;
   performing, by the server, risk analysis of the de-identified dataset to determine a risk metric;
   iteratively performing, by the server, de-identification of the date quasi-identifiers until a defined risk threshold is met relative to the determined risk metric; and
   storing the de-identification dataset in a database.

2. The method of 1, wherein the anchor is a first date in the sequence of the plurality of date events.

3. The method of claim 1, wherein the anchor date is a fixed date added to the longitudinal sequence of the plurality of date events.

4. The method of claim 1 further comprising generating a rear anchor date is a fixed date added to an end of the longitudinal sequence of the plurality of date events.

5. The method of claim 1 further comprising randomizing the running difference within a level of generalization need for de-identification of the dataset.

6. The method of claim 5 wherein the level of generalization is defined by a hierarchy based upon the risk analysis.

7. The method of claim 6 wherein the level of generalization is defined by an interval of days, the level of generalization defining an upper and lower bound for randomization based upon a selected level of de-identification.

8. The method of claim 1, wherein randomization is performed by a uniform probability distribution, linear probability distribution or an exponential probability distribution.

9. The method of claim 1, wherein randomization is performed by a histogram matching the running difference.

10. The method of claim 1, further comprising summing a de-identified running difference to a de-identified anchor date to generate a sequence of de-identified dates therefore preserving a longitudinal order of date events.

11. The method of claim 10 further comprising identifying one or more date events as connected dates to an associated quasi-identifier date wherein the connected dates are modified based upon a de-identified running difference.

12. The method of claim 11 wherein the connected dates are modified by shifting them by a same number of days as de-identified date events they are associated with.

13. The method of claim 12 further comprising generating a consolidated date table comprising quasi-identifier date events from a plurality of data tables to generate a respective single quasi-identifier date to represent the plurality of date events.

14. The method of claim 13 further comprising adding connected dates to a consolidated date table with the quasi-identifier date they are associated with.

15. The method of claim 13 further comprising generating associating each quasi-identifier date event and connected dates with keys to originating date events wherein the keys identify a row within a source table of the dataset.

16. The method of claim 15 further comprising generating a core identifier for quasi-identifier date events, the core identifier defining a column where the quasi-identifier date resides with a source table.

17. The method of claim 16 further comprising performing de-identification using consolidated quasi-identifier date events by generating a destination table corresponding to a respective source table in the dataset using generated keys and core identifiers to map randomized date events to maintain the respective longitudinal sequences.

18. The method of claim 1 wherein risk analysis is determined based upon a level of k-anonymity determined for the dataset.

19. The method of claim 18 wherein performing de-identification of the dataset is performed by an optimal lattice method.

20. A system for de-identifying a dataset, the system comprising:
  a memory storing a database, the memory further storing sets of program instructions;
  a server coupled to the memory, wherein the server, upon executing the sets of program instructions, is configured to:
    retrieve a dataset having a plurality of entries containing personal identifying information;
    identify date quasi-identifiers in the dataset for each of the plurality of entries;
    perform consolidation of a plurality of date events in the date quasi-identifiers and connected dates in the dataset;
    identify an anchor date in a longitudinal sequence of the plurality of date events, wherein the anchor date is a front anchor date at a start of the longitudinal sequence to create a running difference between the plurality of date events in the longitudinal sequence to ensure an order of dates is preserved;
    select a probability distribution based upon a drift threshold, where the drift threshold is an anchor generalization interval minus a generalized difference interval, and wherein the distribution is selected to provide a date drift less than the threshold while achieving a desired risk threshold;
    perform randomization of the running difference with a defined interval for each defined running difference within the longitudinal sequence; wherein randomization is performed by the probability distribution;
    perform de-identification of the plurality of entries in the dataset including the date quasi-identifiers;
    perform risk analysis of the de-identified dataset to determine a risk metric;
    perform de-identification of the date quasi-identifiers iteratively, until a defined risk threshold is met relative to the determined risk metric; and
    store the de-identification dataset in the database.

* * * * *

UNITED STATES PATENT AND TRADEMARK OFFICE
CERTIFICATE OF CORRECTION

PATENT NO. : 9,773,124 B2  
APPLICATION NO. : 14/720009  
DATED : September 26, 2017  
INVENTOR(S) : El Emam et al.

Page 1 of 1

It is certified that error appears in the above-identified patent and that said Letters Patent is hereby corrected as shown below:

On the Title Page

Item "(71)", Column 1, in "Applicant", Line 2, delete "(US)".

Item "(56)", Column 2, in "Primary Examiner", Line 1, delete "Peter" and insert -- Piotr --, therefor.

In the Claims

In Column 13, In Claim 1, Line 43, after "identifying" insert -- , --, therefor.

Signed and Sealed this
Twentieth Day of February, 2018

Andrei Iancu
*Director of the United States Patent and Trademark Office*